(12) United States Patent
Kottilingam et al.

(10) Patent No.: US 8,087,565 B2
(45) Date of Patent: Jan. 3, 2012

(54) PROCESS OF FILLING OPENINGS IN A COMPONENT

(75) Inventors: Srikanth Chandrudu Kottilingam, Simpsonville, SC (US); Charles Gitahi Mukira, Greenville, SC (US); Warren Martin Miglietti, Greenville, SC (US); Arthur S. Peck, Greenville, SC (US); Christopher Penny, Greenville, SC (US); Yan Cui, Greenville, SC (US); Steven Rauch, Yorktown, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/206,033

(22) Filed: Sep. 8, 2008

(65) Prior Publication Data

US 2010/0059573 A1 Mar. 11, 2010

(51) Int. Cl.
*B23K 31/00* (2006.01)
*B23P 6/04* (2006.01)
(52) U.S. Cl. .................. 228/119; 228/165; 29/889.1
(58) Field of Classification Search .................. 228/119, 228/193, 225, 226, 245, 246
See application file for complete search history.

(56) References Cited

U.S. PATENT DOCUMENTS

| | | | |
|---|---|---|---|
| 4,073,639 A | 2/1978 | Duvall et al. | |
| 4,374,183 A * | 2/1983 | Deadmore et al. | 428/641 |
| 4,381,994 A | 5/1983 | Ayers | |
| 5,240,491 A | 8/1993 | Budinger et al. | |
| 5,437,737 A | 8/1995 | Draghi et al. | |
| 5,812,926 A | 9/1998 | Wukusick et al. | |
| 5,902,421 A | 5/1999 | Christy | |
| 6,187,450 B1 | 2/2001 | Budinger et al. | |
| 6,454,156 B1 * | 9/2002 | Taras et al. | 228/165 |
| 6,530,971 B1 | 3/2003 | Cohen et al. | |
| 7,051,435 B1 * | 5/2006 | Subramanian et al. | 29/889.1 |
| 2004/0226982 A1 * | 11/2004 | Nagase et al. | 228/51 |
| 2005/0181231 A1 | 8/2005 | Gupta et al. | |
| 2005/0274009 A1 | 12/2005 | Powers | |
| 2006/0216540 A1 | 9/2006 | Budinger et al. | |
| 2006/0289496 A1 * | 12/2006 | Kelly | 219/679 |
| 2007/0154338 A1 | 7/2007 | Sathian et al. | |

FOREIGN PATENT DOCUMENTS

JP 58039761 A * 3/1983

* cited by examiner

*Primary Examiner* — David Sample
*Assistant Examiner* — Megha Mehta
(74) *Attorney, Agent, or Firm* — Ernest G. Cusick; Gary M. Hartman; Domenica N. S. Hartman

(57) ABSTRACT

A process for filling openings, including blind holes, through-holes, and cavities, in high temperature components. The process entails forming a powder mixture by mixing particles of at least a base alloy and a second alloy that contains a sufficient amount of a melting point depressant to have a lower melting temperature than the base alloy. The powder mixture is combined with a binder and compacted to form a compacted preform, which is then heated to remove the binder and form a rigid sintered preform. The sintered preform is produced, or optionally is further shaped, to have a cross-sectional shape and dimensions to achieve a clearance of up to 200 micrometers with the opening, after which the preform is placed in the opening and diffusion bonded within the opening to form a brazement comprising the particles of the base alloy dispersed in a matrix formed by the second alloy.

22 Claims, 4 Drawing Sheets

PROCESS OF FILLING OPENINGS IN A COMPONENT

BACKGROUND OF THE INVENTION

The present invention generally relates to diffusion brazing processes and materials for components that operate at high temperatures. More particularly, this invention relates to a process of filling blind holes, through-holes, and cavities in castings, such as hot gas path components of gas turbines.

Components of gas turbines, such as buckets (blades), nozzles (vanes), and other hot gas path components, are typically formed of nickel, cobalt or iron-base superalloys with desirable mechanical properties for turbine operating temperatures and conditions. Because the efficiency of a gas turbine is dependent on its operating temperatures, there is a demand for components, and particularly turbine buckets and nozzles, that are capable of withstanding increasingly higher temperatures. As the maximum local metal temperature of a superalloy component approaches the melting temperature of the superalloy, forced air cooling becomes necessary. For this reason, airfoils of gas turbine buckets and nozzles often require complex cooling schemes in which air is forced through internal cooling passages within the airfoil and then discharged through cooling holes at the airfoil surface.

Buckets and nozzles formed by casting processes require cores to define the internal cooling passages. During the casting process, shifting of the cores is prevented by supporting the cores within the mold using quartz rods or similar means. The rods create openings (through-holes) in the casting that must be securely closed or plugged to prevent the loss of cooling air through these holes and ensure proper air flow levels through the intended cooling holes of the casting. Various methods have been used to fill these holes, including brazing and welding techniques, the latter of which includes tungsten inert gas (TIG) welding, electron beam welding, and laser beam welding. In some cases, welding is not practical for closing or filling holes resulting from casting operations due to costs, poor fusion weldability of the material, inaccessibility with welding equipment, and other restrictions arising from the configuration of the component. Furthermore, welding techniques involve application of localized heat energy that produces a fusion zone and a base metal heat affected zone (HAZ) that are prone to liquation and strain age cracking. Brazing techniques are generally performed at temperatures lower than the melting point of the base metals and, when performed appropriately, are not susceptible to cracking.

Brazing performed on superalloy castings have typically involved the use of braze materials in pliable forms such as pastes, putties, slurries, and tapes, as evidenced by commonly-assigned U.S. Pat. No. 6,187,450 to Budinger et al., U.S. Pat. No. 6,530,971 to Cohen et al., and U.S. Pat. No. 7,279,229 to Budinger et al. Brazing techniques using sintered preforms have also been proposed for applying wear resistant materials on bucket surfaces, as taught in commonly-assigned U.S. Pat. No. 7,335,427 to Sathian, and for surface buildup and hardfacing as taught in commonly-assigned U.S. Published Patent Application No. 2007/0154338 to Sathian et al.

Brazing pastes, putties, slurries, and tapes generally contain metal particles in a binder that adheres the metal particles together and to the surface(s) being brazed, and then burns off during the brazing operation. The metal particles are typically a mixture of two or more different alloys, one of which contains a melting point depressant (for example, boron or silicon) to achieve a lower melting point. During brazing, only the lower melting particles melt to form a liquid that fills voids between the higher melting particles and, on solidification, bonds the high melting particles together and to the substrate material. Shortcomings associated with the use of such pliable braze materials include the difficulty of consistently using optimal quantities of the braze material, accurately placing the braze material, and accurately shaping and sizing the braze material for the area being brazed. Because of their pliability, which includes the ability to flow in the case of slurries, other shortcomings include the difficulty of filling large openings and surfaces where the braze material is likely to flow away from the area being brazed. Still other shortcomings typically include low densities and excessive porosity and voids, resulting in poor mechanical properties for the resulting brazement.

Sintered brazing preforms may also be initially prepared to contain a binder, which is removed during a sintering operation performed prior to brazing, resulting in the metal particles being sintered together (fused or agglomerated) to yield a rigid preform. Because of their rigidity, sintered preforms have been generally limited to surface repairs, as suggested by the above-identified patent documents to Sathian and Sathian et al.

BRIEF DESCRIPTION OF THE INVENTION

The present invention provides a process suitable for filling and optionally closing openings, including blind holes, through-holes, and cavities, in high temperature components such as buckets, nozzles, and other hot gas path components of gas turbines. The invention makes use of a sintered preform whose size, shape, and composition can be tailored for a given application.

The process generally entails forming a powder mixture by mixing particles of at least a base alloy and a second alloy. The base alloy constitutes about 30 to about 90 weight percent of the powder mixture, and the second alloy contains a sufficient amount of one or more melting point depressants to have a lower melting temperature than the base alloy. The powder mixture is combined with a binder and compacted to form a compacted preform, which is then heated to remove the binder and form a rigid sintered preform. As produced or following an optional shaping step, the sintered preform has a cross-sectional shape and dimensions to achieve a clearance of not greater than 200 micrometers with an opening to be filled with the sintered preform, after which the sintered preform is placed in the opening and diffusion braze bonded within the opening to form a brazement comprising the particles of the base alloy dispersed in a matrix formed by the second alloy.

According to a preferred aspect of the invention, any number of powders with different chemistries can be used to yield a sintered preform whose chemistry can be tailored to achieve specific material properties and brazing temperatures for a variety of applications. A particular example is the use of a superalloy as the base alloy powder to form brazements capable of filling and closing blind holes, through-holes, and cavities in buckets, nozzles, and other hot gas path components of gas turbines. Furthermore, the sintered preform can be consistently produced to near-net shape and size, with no limitations as to the size, shape, or orientation of the opening to be filled by the preform. Very high densities are also possible, resulting in improved properties for the brazement. Consequently, the process of this invention is capable of overcoming a variety of difficulties associated with the use of pliable brazing materials such as pastes, putties, slurries, and tapes. Moreover, the preform can be shaped to include enhancements such as self-locking features and cooling features, for example, cooling holes.

Other objects and advantages of this invention will be better appreciated from the following detailed description.

DETAILED DESCRIPTION OF THE INVENTION

Figure 1:
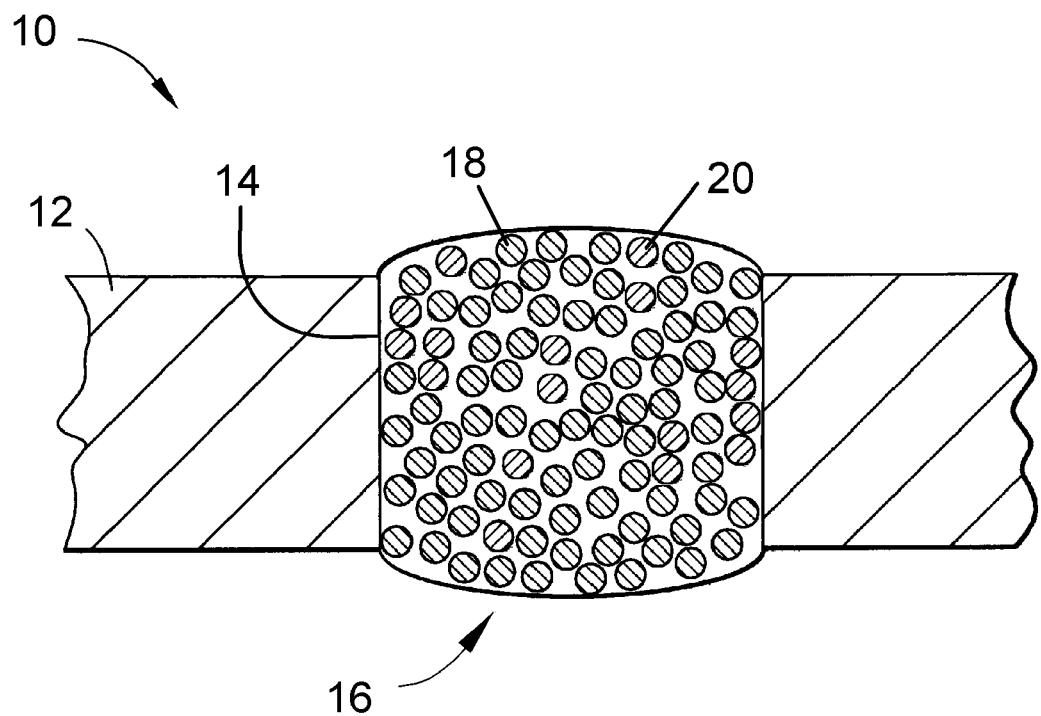
FIG. 1 represents a cross-section through a hole in a wall of a component, and a sintered preform fit within the hole in accordance with an embodiment of the present invention.

FIG. 1 represents a cross-section through a wall 12 of a component 10, such as a bucket, nozzle, or other hot gas path component of a gas turbine. The component 10 is preferably cast from a high-temperature material, notable examples of which include nickel-based superalloys such as René N4, René N5, René 108, GTD-111®, GTD-222®, GTD-444® and IN-738, and cobalt-based superalloys such as FSX-414. René N4, René N5, René 108, GTD-111®, GTD-222®, GTD-444® are gamma prime-strengthened nickel-based superalloys whose compositions are reported in various literature, including U.S. Pat. Nos. 4,810,467, 5,154,884, 5,399,313, 6,074,602, 6,416,596, 6,428,637, and others. The nominal composition of FSX-414 is, by weight, about 29.5% chromium, 10.5% nickel, 7% tungsten, up to 2% iron, 0.25% carbon, and 0.012% boron, the balance cobalt and incidental impurities. The nominal composition of IN-738 is reported as, by weight, about 16% chromium, 8.5% cobalt, 1.75% molybdenum, 2.6% tungsten, 1.75% tantalum, 0.9% niobium, 3.4% aluminum, 3.4% titanium, 0.10% zirconium, 0.01% boron, 0.17% carbon, the balance nickel and impurities. These alloys are notable as they are susceptible to cracking when welded, though the invention is also applicable to other high temperature alloys.

As discussed previously, buckets, nozzles and other hot gas path components formed by casting often require internal cooling passages, necessitating the use of cores during the casting process to define the passages and rods or other suitable means to support and prevent shifting of the cores during casting. FIG. 1 represents the component 10 as having a through-wall hole 14 created by such a rod. In most situations, the hole 14 must be securely closed following the casting operation to prevent the loss of cooling air through the hole 14 once the component 10 is installed in a gas turbine. For this purpose, FIG. 1 represents a step in a process for filling and closing the hole 14 in the component 10 using a sintered preform 16 sized and shaped to closely fit within the hole 14.

The sintered preform 16 is schematically represented as containing a mixture of particles 18 and 20 that have been sintered together at a temperature below their melting points to form an agglomerate and somewhat porous mass. Suitable particle size ranges for the powder particles 18 and 20 are generally −150 mesh, more preferably 325 mesh or smaller to promote rapid sintering of the particles 18 and 20 and minimize porosity in the preform 16 to about 90 volume percent or less. As discussed below, the sintered perform can be subjected to hot isostatic pressing (HIP) or vacuum/inert atmosphere pressing to promote higher densities.

Suitable powder materials include particles 18 formed of a base alloy having a composition similar to that of the alloy of the component 10, preferably a high strength superalloy, and particles 20 of a second and different alloy powder that may also have a composition similar to that of the component alloy, but further containing a melting point depressant such as boron or silicon to promote sintering of the particles 18 and 20 and enable bonding of the preform 16 to the component 10 at temperatures below the melting point of the component alloy. The particles 18 and 20 of the base and second alloy powders are preferably present in the preform 16 in relative amounts to achieve a strong metallurgical bond with the base metal of the component 10.

Preferred properties for the base alloy of the particles 18 include chemical and metallurgical compatibility with the alloy being brazed, fatigue strength, low tendency for cracking, oxidation resistance, and machinability. Particularly suitable base alloys also have a melting point of within about 25° C. of the melting temperature of the alloy being brazed, and a compositional range of, by weight, about 2.5 to 11% cobalt, 7 to 9% chromium, 3.5 to 11% tungsten, 4.5 to 8% aluminum, 2.5 to 6% tantalum, 0.02 to 1.2% titanium, 0.1 to 1.8% hafnium, 0.1 to 0.8% molybdenum, 0.01 to 0.17% carbon, up to 0.08% zirconium, up to 0.60 silicon, up to 2.0 rhenium, the balance nickel and incidental impurities. A preferred composition for the base alloy is believed to be, by weight, about 9 to 11% cobalt, 8 to 8.8% chromium, 9.5 to 10.5% tungsten, 5.3 to 5.7% aluminum, 2.8 to 2.3% tantalum, 0.9 to 1.2% titanium, 1.2 to 1.6% hafnium, 0.5 to 0.8% molybdenum, 0.13 to 0.17% carbon, 0.03 to 0.08% zirconium, the balance nickel and incidental impurities. Particular compositions for the base alloy particles 18 will depend on the composition of the wall 12 being brazed.

Particularly suitable compositions for the second alloy particles 20 have a melting temperature below the melting temperature of the base alloy particles 18, and preferably about 25° C. to about 50° C. below the grain growth or incipient melting temperature of the alloy being brazed in order to preserve the desired microstructure of the component 10 during the brazing process. A nonlimiting example of a suitable composition for the second alloy particles 20 is, by weight, about 9 to 10% cobalt, 11 to 16% chromium, 3 to 4% aluminum, 2.25 to 2.75% tantalum, 1.5 to 3.0% boron, up to 5% silicon, up to 1.0% yttrium, the balance nickel and incidental impurities. Particular compositions for the second alloy particles 20 will depend on the compositions of the base alloy particles 18 and the wall 12 being brazed.

Figure 2:
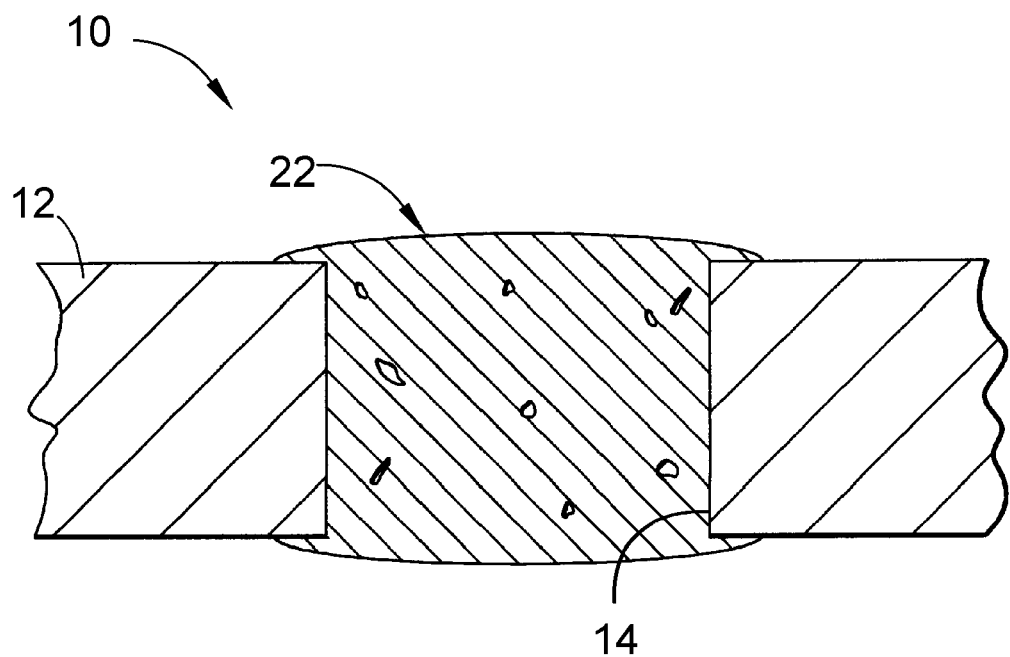
FIG. 2 is a cross-sectional view of the wall of FIG. 1 after heating of the preform to form a brazement plug that closes the hole.

A lower limit for the second alloy particles 20 in the sintered preform 16 is believed to be about 10 weight percent in order to provide sufficient melting point depressant to ensure wetting and diffusion bonding of the particles 18 and 20 to each other and to the walls of the hole 14. In excess of about 70 weight percent of the preform 16, the second alloy can undesirably reduce the mechanical and environmental properties of the resulting brazement 22 (FIG. 2). The base alloy particles 18 constitute the remainder of the sintered preform 16 (about 30 to about 90 weight percent). In a preferred embodiment, the base alloy particle content of the preform 16 is about 40 to about 70 weight percent, with the balance being particles 20 of the second alloy.

Aside from the base and second alloy particles 18 and 20, no other constituents are required to within the sintered preform 16. However, a binder is preferably initially blended with the particles 18 and 20 to form a cohesive mass that can be more readily shaped prior to sintering. Suitable binders for this purpose include, for example, a binder commercially available under the name NICROBRAZ-S from the Wall Colmonoy Corporation. Other potentially suitable binders include NICROBRAZ 320, VITTA GEL from Vitta Corporation, and others including adhesives commercially available from Cotronics Corporation, all of which preferably volatilize cleanly during sintering. Suitable amounts for the binder relative to the powder particles 18 and 20 can be determined based on routine experimentation.

The preform 16 is formed by mixing the powder particles 18 and 20 by any suitable means. After mixing, the powder mixture is preferably combined with the binder and cast into shapes, during which the binder can be burned off. The cast preform is then placed in a non-oxidizing (vacuum or inert gas) atmosphere furnace for the sintering operation, during which the powder particles 18 and 20 undergo sintering to yield the sintered preform 16 with good structural strength and low porosity. Suitable sintering temperatures depend on the particular compositions of the particles 18 and 20, but will generally be in a range of about 1850° F. to about 2275° F. (about 1010° C. to about 1245° C.). Following sintering, the perform can be HIPed or vacuum pressed to achieve densities greater than 95%.

According to a preferred aspect of the invention, the preform 16 may be initially formed in an oversize condition relative to the hole 14 to allow for machining of the preform 16 to a size and shape that closely fits within and completely fills the hole 14. As such, prior to machining the preform 16 can have a height of greater than the through-hole (axial) dimension of the hole 14 and a cross-section larger than and different from the hole 14, and can then be sintered to have essentially any dimensions (width and height) and cross-sectional shape (simple closed curve, simple polygon, and combinations thereof) necessary to fill the hole 14. Because of its rigidity, the preform 16 should be sized and shaped to provide a very close fit within the hole 14 to achieve a proper joint gap at the brazing temperature. For this reason, the clearance between the preform 16 and the walls of the hole 14 is preferably not greater than about 200 micrometers, for example, about 25 to about 150 micrometers and more preferably about 25 to about 75 micrometers. Suitable methods for machining the preform 16 include turning, milling, EDM, ECM, waterjet, and laser. Machining is preferably carried out so as not to form a recast layer on the surface of the preform 16 caused by melting and resolidification of the preform powders 18 and 20. Alternatively, any recast layer can be removed following machining and before the brazing operation. While the preform 16 is shown in FIG. 1 as largely being confined to the hole 14, it is foreseeable that the preform 16 could protrude more from the hole 14, and that such a protrusion could be wider than the hole 14 to provide additional brazing material (as evident from FIGS. 4 and 5 discussed below).

Once placed in the hole 14 (FIG. 1), the sintered preform 16 and component 10 are heated within a non-oxidizing (vacuum or inert gas) atmosphere to a temperature capable of melting the lower melting particles 20, typically in a range of about 2050° F. to about 2275° F. (about 1120° C. to about 1245° C.) (depending on composition) for a period of about 10 to about 60 minutes. The second alloy particles 20 melt and wet the base alloy particles 18 and the walls of the hole 14, creating a two-phase mixture that alloys together. If desired, a small amount of additional low melt constituent material can be placed between the preform 16 and the walls of the hole 14 to improve brazement quality. Thereafter, the component 10 and the two-phase mixture are cooled below the solidus temperature of the mixture to solidify the mixture and form the superalloy brazement 22 shown in FIG. 2. The brazement 22 then undergoes a heat treatment at a temperature of about 1975° F. to about 2100° F. (about 1080° C. to about 1150° C.) for a duration of about thirty minutes to about four hours to further interdiffuse the base and second alloys of the particles 18 and 20 and the alloy of the component 10. After heat treatment, any excess material in the brazement 22 can be removed by grinding or any other suitable method.

FIGS. 3 through 10 depict additional configurations of sintered preforms 16 in accordance with further embodiments of this invention. In these figures, consistent reference numbers are used to identify similar structures.

Figure 3:
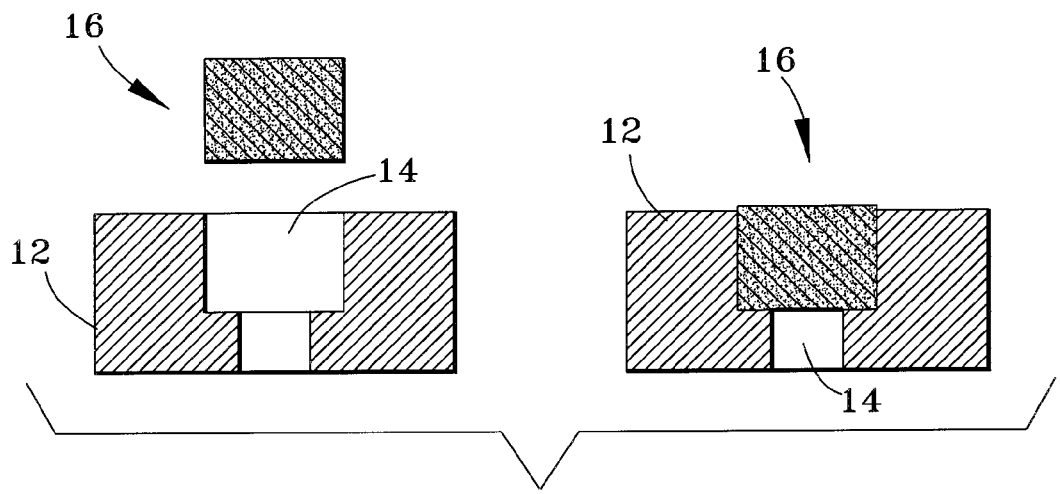
FIG. 3 represents a preform prior to insertion into a countersunk through-hole in a component wall, and after placing the preform within the hole and performing a brazing operation to form a brazement that closes the hole in accordance with another embodiment of the invention.
Figure 4:
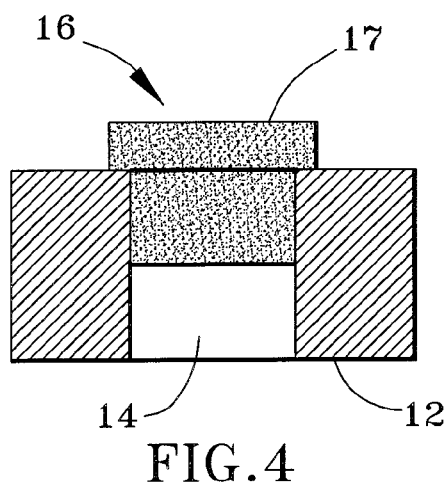
FIGS. 4 and 5 represent an alternative cross-sectional shape for a sintered preform installed in a straight through-hole and a countersunk through-hole, respectively, in a component wall in accordance with further embodiments of the invention.
Figure 5:
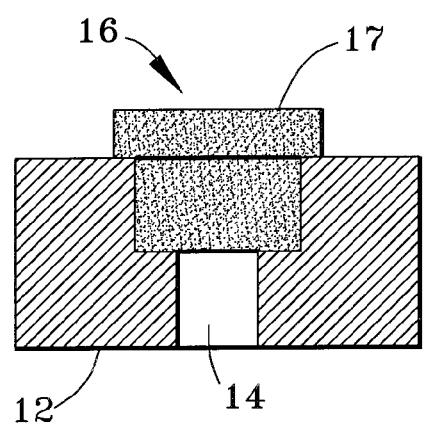
Figure 6:
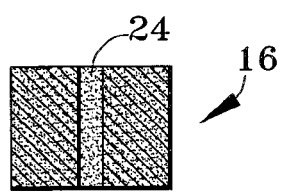
FIGS. 6 and 7 represent sintered preforms with cooling holes in accordance with further embodiments of the invention.
Figure 7:
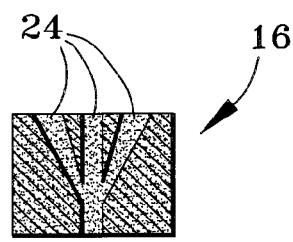
Figure 8:
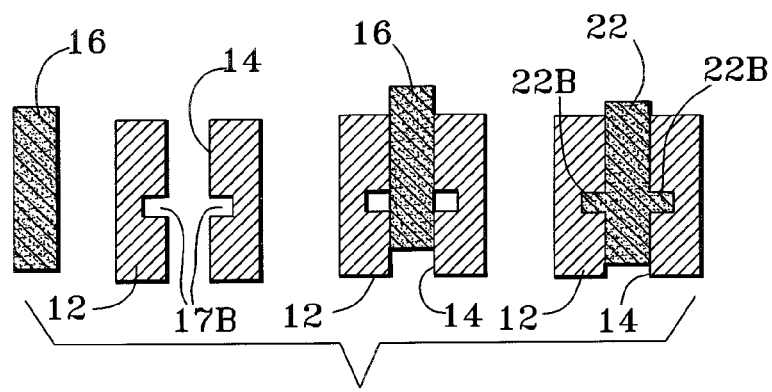
FIGS. 8, 9 and 10 represent alternative cross-sectional shapes for holes into which sintered preforms of this invention are placed in accordance with additional embodiments of the invention.
Figure 9:
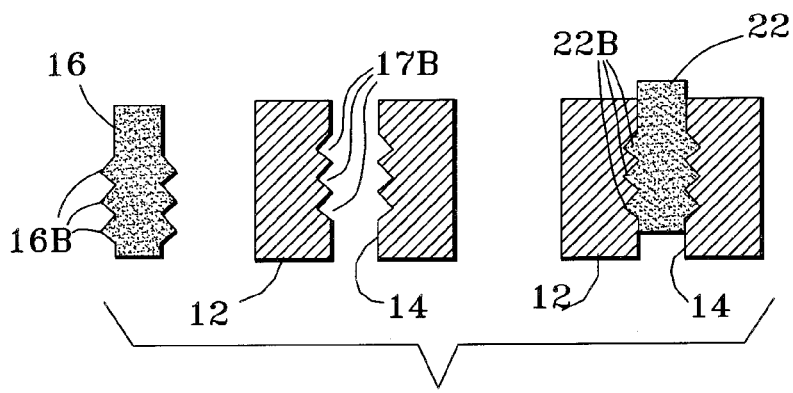
Figure 10:
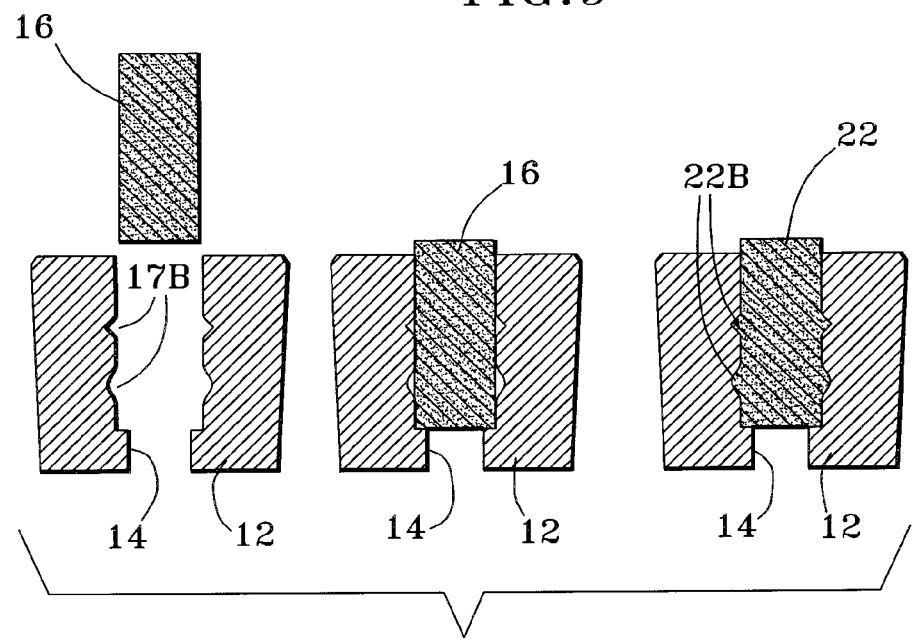

FIG. 3 represents a sintered preform 16 of this invention before and after insertion in a through-hole 14, with the fundamental difference with the embodiment of FIGS. 1 and 2 being that the hole 14 has a countersunk cross-section. FIG. 4 differs from FIGS. 1 and 2 as a result of the sintered preform 16 having an enlarged cap or head 17A that assists in establishing the depth to which the preform 16 can be inserted into the hole 14. FIG. 5 depicts a sintered preform 16 similar to FIG. 4, but inserted in a countersunk through-hole 14. FIGS. 6 and 7 depict sintered preforms 16 with cooling holes 24 that extend axially through the preforms 16, enabling the brazements (22) produced therefrom to define cooling holes (or another type of outlet/inlet) for the component 10 in which the preform 16 will be installed. Finally, FIGS. 8, 9 and 10 represent alternative cross-sectional shapes for the holes 14 and/or preforms 16 that yield one or more interlocking features following a brazing cycle. In FIGS. 8 and 10, the interlocking features are represented as grooves 17B defined in the walls of the hole 14 and into which the preform 16 flows during brazing, thereby creating a brazement protrusion 22B that extends into the grooves 17B of the hole 14, effectively increasing the shear surface area of the bond. In FIG. 9, the interlocking features are represented as grooves (for example, female threads) defined in the walls of the hole 14 and complementary protrusions (for example, male threads) 16B defined on the preform 16. As a result of the brazing operation, the protrusions 16B on the preform 16 form brazement protrusions 22B that extend into the grooves 17B of the hole 14, again effectively increasing the shear surface area of the bond. If the hole 14 is defined to have one or more interlocking features (such as, but not limited to, one of those shown in FIGS. 8 and 10), the clearance between the preform 16 and the walls of the hole 14 refers to the clearance between the portions of the preform 16 and hole 14 other than their interlocking features. As evident from FIGS. 3 through 9, the embodiments of FIGS. 3 through 5 and 8 through 9 have the ability to completely fill and close the openings 14, whereas the preforms 16 of FIGS. 6 and 7 intentionally do not due to the intentional presence of their cooling holes 24.

In an investigation leading up to this invention, holes were drilled in a directionally-solidified stage 2 bucket formed of the GTD-111® superalloy. The holes had diameters of about three millimeters, and passed entirely through a wall having a thickness of about 1.5 millimeters. For the investigation, preforms were prepared containing two different powders. The first powder (designated the base alloy) had a nominal composition of, by weight, about 10% cobalt, 8.4% chromium, 10% tungsten, 5.5% aluminum, 3% tantalum, 1% titanium, 1.4% hafnium, 0.6% molybdenum, 0.15% carbon, 0.05% zirconium, the balance nickel and incidental impurities. The second powder was a lower-melting alloy having a nominal composition of, by weight, about 10% cobalt, 14% chromium, 3.5% aluminum, 2.5% tantalum, 2.75% boron, 0.01% yttrium, the balance nickel and incidental impurities. The powders were combined at a ratio of about 1:1 by weight.

Figure 11:
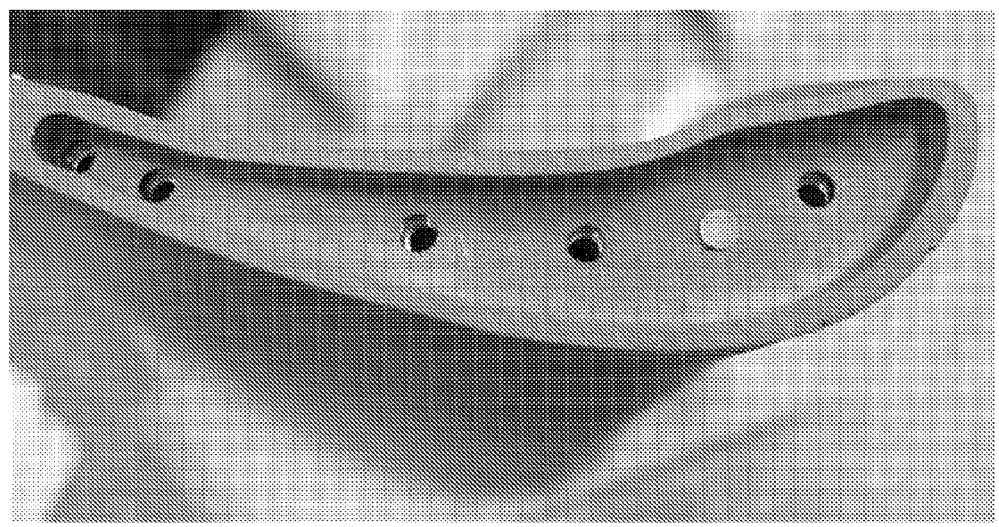
FIG. 11 is a scanned image showing a sintered preform of this invention installed in a through-hole drilled in a tip of a turbine bucket.

The powders were mixed with a binder, extruded to form compacted preforms, and then sintered in a mold at a temperature of about 2100° F. (about 1150° C.) for a duration of about thirty minutes to produce solid, rigid preforms having heights of about twenty-five millimeters, diameters of about five millimeters, and porosities of less than five volume percent. The preforms were then sintered by turning to obtain a shape and dimensions similar to that of the hole. The sintered preform height was about two millimeters and the sintered preform diameter was about 2.946 millimeters, resulting in a diametrical clearance between the preforms and holes of about 0.054 micrometer. FIG. 11 is a scanned image showing one of the sintered preforms installed in one of the through-holes drilled in one of the buckets.

The preforms were diffusion bonded within the holes using a vacuum heat treatment furnace. The heating rate was about 20° F./minute (about 11° C./min) to about 1000° F. (about 540° C.) and held for about one hour, followed by heating to about 1950° F. (about 1065° C.) and holding for about thirty minutes to attain temperature equalization. Thereafter, the preform was heated to about 2175° F. (about 1190° C.) at a rate of about 20° F./min (about 11° C./min) and held for about thirty minutes. After the completion of the hold time, furnace cooling was performed to about 2050° F. (about 1120° C.) held for about two hours, followed by fast cooling to room temperature. The braze soak temperature of about 2175° F. (about 1190° C.) was chosen to ensure that the particles of the lower-melting alloy would fully melt during brazing to infiltrate the still solid particles of the base alloy and wet the walls of the holes, and on cooling resolidify to bond together the base alloy particles. During the braze soak hold, interdiffusion occurred of the low melt constituent (boron) of the lower-melting alloy particles into the solid base alloy particles and the walls of the holes, with the result that the melting temperature of the resulting brazements was higher than the melting temperature of the original lower-melting alloy. A further increase in the remelt temperature of the brazements can be achieved through an additional diffusion heat treatment, during which the remelt temperature of the brazements further increases and the metallurgical bond properties between the brazements and hole walls are improved.

Figure 12:
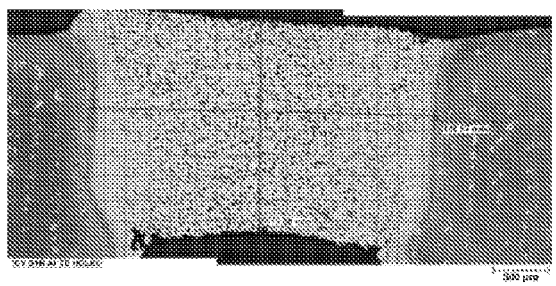
FIGS. 12 and 13 are scanned images showing cross-section and plan views, respectively, of the preform of FIG. 11 following a brazing operation.
Figure 13:
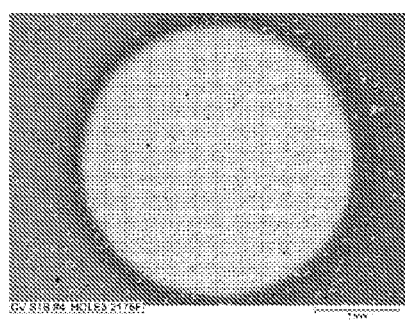

The brazements were inspected using visual and penetrant inspection methods to ascertain whether proper wetting and bonding had occurred and assesses the presence of voids. The brazements were then sectioned for metallographic analysis to look for lack of bonding, internal voids and porosity. FIGS. 12 and 13 are scanned images showing one of the brazements in cross-section and in a plan view, respectively, and evidence that the preform produced a brazement well-bonded to the through-hole wall and containing very low porosity and no internal voids.

While the invention has been described in terms of particular embodiments, it is apparent that other forms could be adopted by one skilled in the art. Therefore, the scope of the invention is to be limited only by the following claims.

The invention claimed is:

1. A process of filling a hole in a surface of a component formed of a nickel- or cobalt-base alloy, the process comprising:
    forming the hole to have an axial direction, a wall parallel to the axial direction and defining a cross-sectional shape of the hole perpendicular to the axial direction, and at least one interlocking feature separated from the surface of the component by the wall, the interlocking feature comprising a recess that diverges from the hole in a direction transverse to the axial direction of the hole;
    forming a powder mixture by mixing particles of at least a base alloy and a second alloy, the base alloy constituting about 30 to about 90 weight percent of the powder mixture, the second alloy containing a sufficient amount of a melting point depressant to have a lower melting temperature than the base alloy;
    combining the powder mixture with a binder and then compacting the combined powder mixture and binder to form a compacted preform;
    heating the compacted preform to remove the binder and form a sintered preform;
    placing the sintered preform within the hole so that a perimeter thereof is surrounded by the wall of the hole, wherein the perimeter defines a cross-sectional shape of the sintered preform that corresponds to the cross-sectional shape of the hole and has dimensions to achieve a clearance of not greater than 200 micrometers between the perimeter of the sintered preform and the wall of the hole; and then
    diffusion braze bonding the sintered preform within the hole to form a brazement within the hole comprising the particles of the base alloy dispersed in a matrix formed by the second alloy, wherein during the diffusion braze bonding step the sintered preform flows from the perimeter thereof into the recess and following the diffusion braze bonding step the brazement has a protrusion that extends into the recess and increases the shear surface area of a bond between the brazement and the wall of the hole.

2. The process according to claim 1, wherein the sintered preform has a density of at least 90% of theoretical.

3. The process according to claim 1, wherein the base alloy consists essentially of, by weight, about 2.5 to 11% cobalt, 7 to 9% chromium, 3.5 to 11% tungsten, 4.5 to 8% aluminum, 2.5 to 6% tantalum, 0.02 to 1.2% titanium, 0.1 to 1.8% hafnium, 0.1 to 0.8% molybdenum, 0.01 to 0.17% carbon, up to 0.08% zirconium, up to 0.60 silicon, up to 2.0 rhenium, the balance nickel and incidental impurities.

4. The process according to claim 1, wherein the second alloy consists essentially of, by weight, about 9 to 10% cobalt, 11 to 16% chromium, 3 to 4% aluminum, 2.25 to 2.75% tantalum, 1.5 to 3.0% boron, up to 5% silicon, up to 1.0% yttrium, the balance nickel and incidental impurities.

5. The process according to claim 1, wherein the particles of the base and second alloys are mixed together at a weight ratio of about 30:70 to about 90:10, respectively.

6. The process according to claim 1, wherein the cross-sectional shape and dimensions of the sintered preform are achieved by shaping the sintered preform prior to placing the sintered preform in the hole.

7. The process according to claim 1, wherein the brazement completely closes the hole following the diffusion braze bonding step.

8. The process according to claim 1, further comprising the steps of casting the component to contain an internal cooling passage formed by a core, and creating a cooling hole connected to the internal cooling passage of the component by forming the sintered preform to have a through-hole therein that defines the cooling hole entirely through the brazement following the diffusion braze bonding step.

9. The process according to claim 1, wherein the component is a hot gas path component of a gas turbine.

10. The process according to claim 1, wherein the sintered preform does not protrude into or fill the recess.

11. The process according to claim 1, wherein the sintered preform comprises a protrusion that radially protrudes from the perimeter thereof and protrudes into the recess as a result of the placing step.

12. A process of filling a hole in a surface of a hot gas path component of a gas turbine, the component being cast from a nickel- or cobalt-base alloy and the hole being formed by a rod that supported a core within the component during casting of the component wherein the hole has an axial direction and a wall parallel to the axial direction and defining a cross-sectional shape of the hole perpendicular to the axial direction, the process comprising:
  forming the hole to have at least one interlocking feature separated from the surface of the component by the wall of the hole, the interlocking feature comprising a recess that diverges from the hole in a direction perpendicular to the axial direction of the hole;
  forming a powder mixture by mixing particles of at least a base alloy and a second alloy, the base alloy constituting about 30 to about 90 weight percent of the powder mixture, the second alloy containing a sufficient amount of a melting point depressant to have a lower melting temperature than the base alloy;
  combining the powder mixture with a binder and then compacting the combined powder mixture and binder to form a compacted preform;
  heating the powder mixture to remove the binder and form a sintered preform having a cross-section larger than the hole;
  shaping the sintered preform to produce a cross-sectional shape and dimensions to achieve a diametrical clearance of not greater than 200 micrometers with the hole;
  placing the sintered preform within the hole so that a perimeter thereof is surrounded by the wall of the hole and the sintered preform at least partially fills the hole, wherein the perimeter defines a cross-sectional shape of the sintered preform that corresponds to the cross-sectional shape of the hole and has dimensions to achieve a clearance of not greater than 200 micrometers between the perimeter of the sintered preform and the wall of the hole; and then
  diffusion braze bonding the sintered preform within the hole to at least partially fill the hole with a brazement comprising the particles of the base alloy dispersed in a matrix formed by the second alloy, wherein during the diffusion braze bonding step the sintered preform flows from the perimeter thereof into the recess and following the diffusion braze bonding step the brazement has a protrusion that extends into the recess and increases the shear surface area of a bond between the brazement and the wall of the hole.

13. The process according to claim 12, wherein the sintered preform has a density of at least 90% of theoretical.

14. The process according to claim 12, wherein the base alloy consists essentially of, by weight, about 9 to 11% cobalt, 8 to 8.8% chromium, 9.5 to 10.5% tungsten, 5.3 to 5.7% aluminum, 2.8 to 2.3% tantalum, 0.9 to 1.2% titanium, 1.2 to 1.6% hafnium, 0.5 to 0.8% molybdenum, 0.13 to 0.17% carbon, 0.03 to 0.08% zirconium, the balance nickel and incidental impurities.

15. The process according to claim 12, wherein the second alloy consists essentially of, by weight, about 9 to 10% cobalt, 11 to 16% chromium, 3 to 4% aluminum, 2.25 to 2.75% tantalum, 1.5 to 3.0% boron, up to 5% silicon, up to 1.0% yttrium, the balance nickel and incidental impurities.

16. The process according to claim 12, wherein the particles of the base and second alloys are mixed together at a weight ratio of about 40:60 to about 70:30, respectively.

17. The process according to claim 12, wherein the shaping step comprises a machining operation and the sintered preform does not have a recast surface when placed in the hole.

18. The process according to claim 12, wherein the brazement completely closes the hole following the diffusion braze bonding step.

19. The process according to claim 12, wherein the component contains an internal cooling passage formed by the core during casting of the component, the process further comprising creating a cooling hole connected to the internal cooling passage of the component by forming the sintered preform to have a through-hole therein that defines the cooling hole entirely through the brazement following the diffusion braze bonding step.

20. The process according to claim 12, wherein the component is chosen from the group consisting of turbine buckets and turbine nozzles.

21. The process according to claim 12, wherein the sintered preform does not protrude into or fill the recess.

22. The process according to claim 12, wherein the sintered preform comprises a protrusion that radially protrudes from the perimeter thereof and protrudes into the recess as a result of the placing step.

* * * * *